Dec. 18, 1962  R. W. BUNTENBACH  3,069,546
RADIANT-ENERGY TRANSLATION SYSTEM
Filed June 4, 1948  3 Sheets-Sheet 1
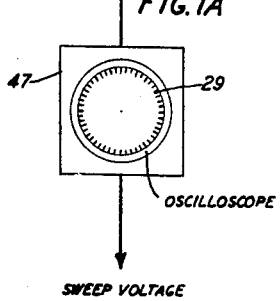
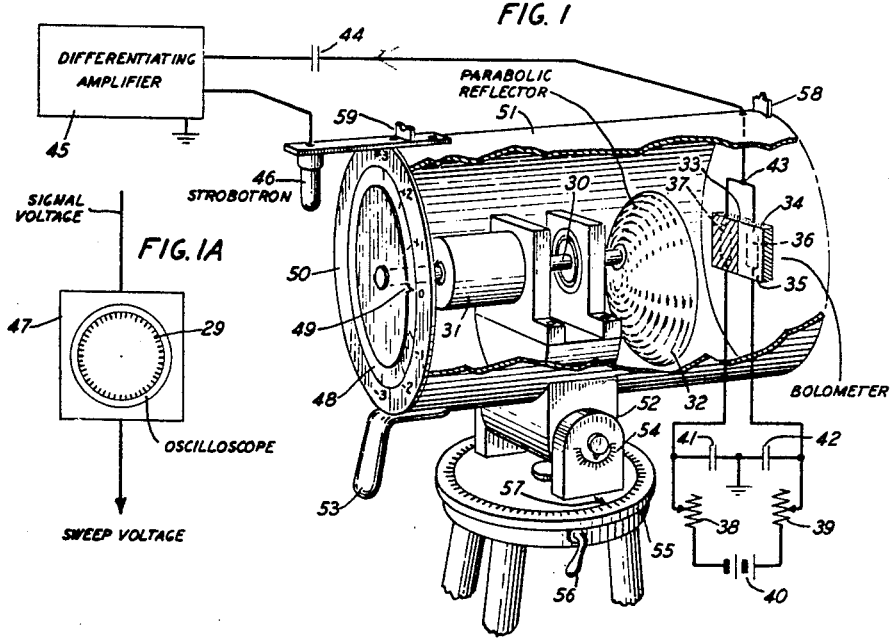
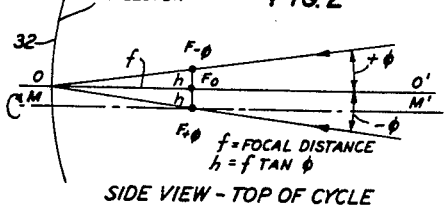
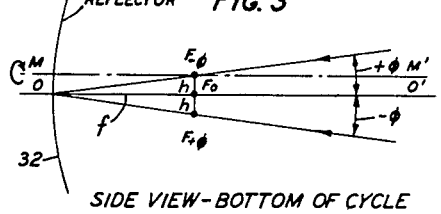
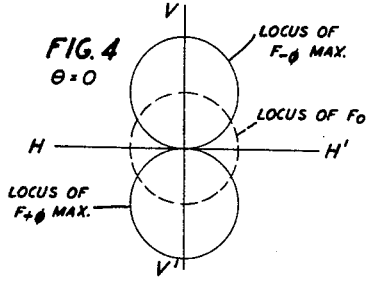
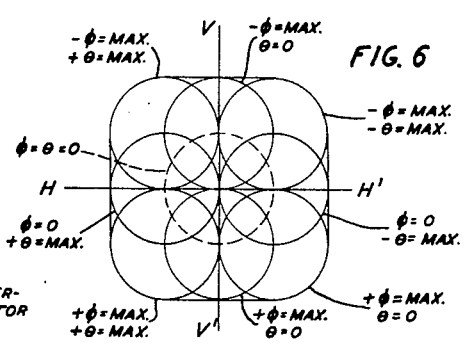
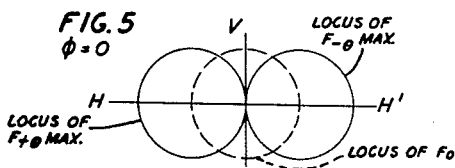
INVENTOR
R. W. BUNTENBACH
BY
G. H. Hewlett
ATTORNEY

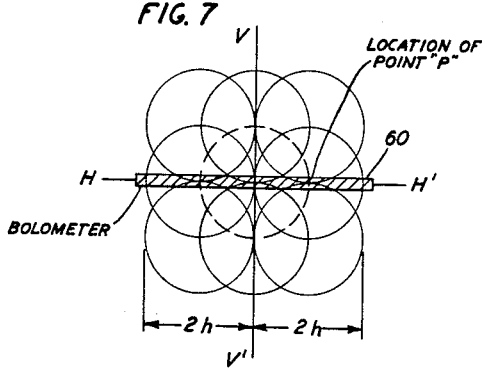
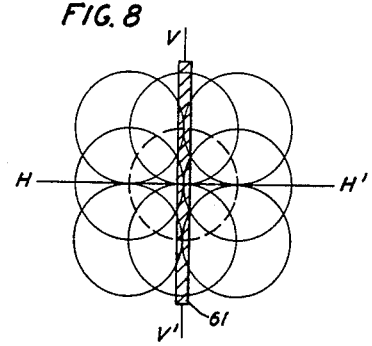
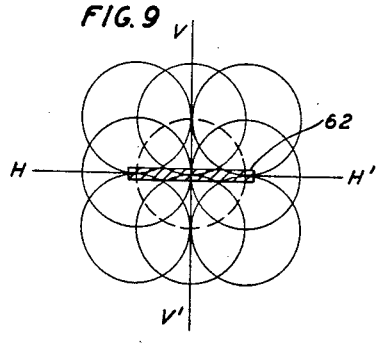
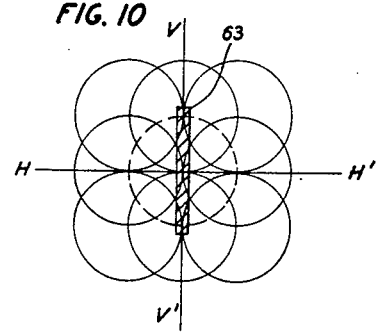
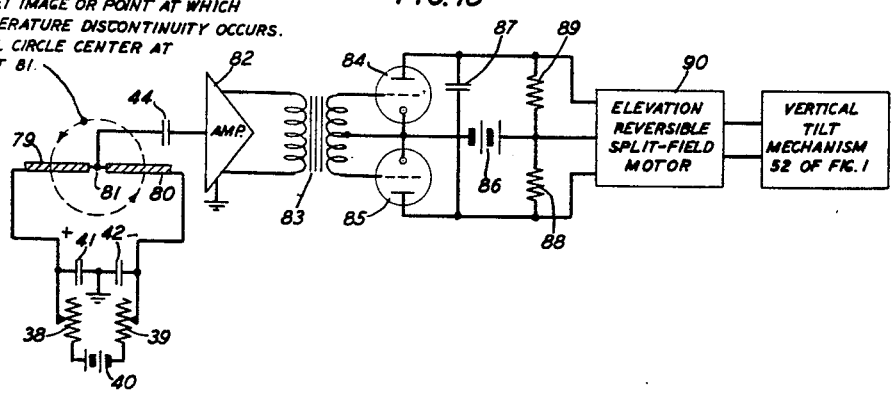

Dec. 18, 1962 R. W. BUNTENBACH 3,069,546
RADIANT-ENERGY TRANSLATION SYSTEM
Filed June 4, 1948 3 Sheets-Sheet 3
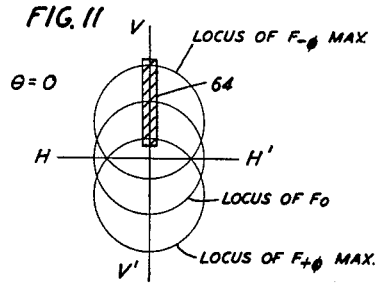
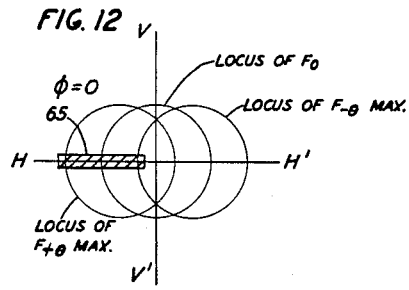
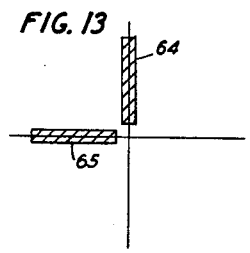
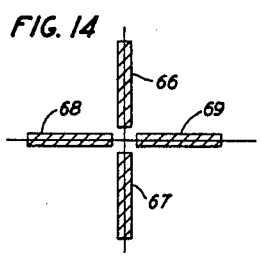
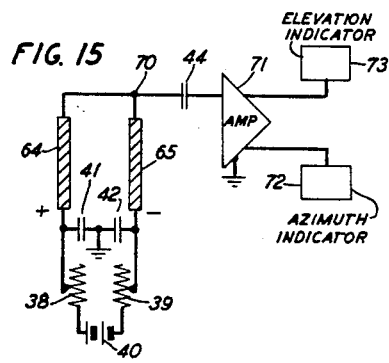
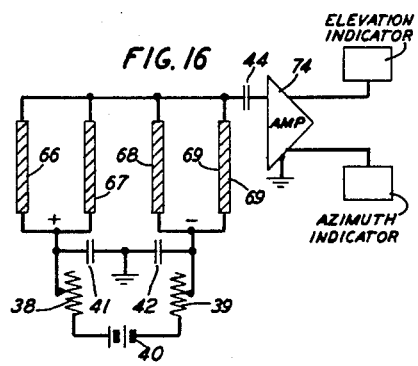
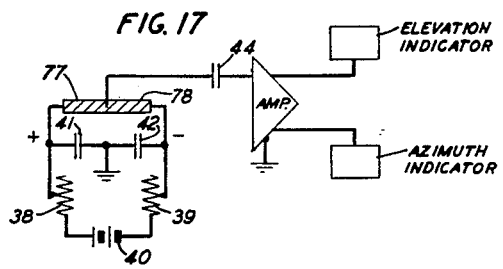
INVENTOR
R. W. BUNTENBACH
BY
*G. H. Hewitt*
ATTORNEY

United States Patent Office 3,069,546
Patented Dec. 18, 1962

3,069,546
RADIANT-ENERGY TRANSLATION SYSTEM
Rudolph W. Buntenbach, Summit, N.J., assignor to Bell Telephone Laboratories, Incorporated, New York, N.Y., a corporation of New York
Filed June 4, 1948, Ser. No. 31,145
9 Claims. (Cl. 250—83.3)

This invention relates to radiant-energy direction systems and in particular to those detection systems and methods which utilize thermal-energy radiations.

An object of the invention is to obtain a thermal-energy detector suitable for determining elevation and azimuth.

A further object is to obtain a thermal-energy detector which is inexpensive to manufacture and maintain, and which comprises a minimum of moving parts.

Other objects and uses of the invention will be apparent from a study of the specification and drawings.

The system in accordance with the invention may utilize radiations from the ultra-violet, visible light and infra-red wave bands, or from any one of these wave bands. In the preferred embodiment of the invention infra-red radiations of wavelengths from 7000 to $4 \times 10^6$ angstrom units are used.

In the system, in accordance with the preferred embodiment of the invention, bearing information, concerning the direction of a target with reference to the system, is obtained by cyclically changing the direction of thermal-energy radiation after it has emanated from a section of an area under observation, in a known manner with respect to a reference direction, at a point between a thermal-energy source and a thermal-energy sensitive element contained in the system. Within the system a parabolic reflector adaptable for rotation is eccentrically secured to a rotating support so that the optical axis of the reflector is parallel to but offset from the reflector motion axis. The eccentrically mounted and rotating reflector is directed towards sections of an area under observation and collects thermal-energy radiation emanating from the sections. The reflector focal point travels along a circular pathway as the reflector revolves, and a thermal-energy sensitive unit can be situated in front of the reflector focal plane so that thermal radiations brought to a focus at the reflector focal point can intermittently impinge upon the sensitive unit, at some instant or instants during the transition of the focal point along the circular pathway. When a temperature discontinuity source is encountered, in the course of scanning an area, the amount of thermal-energy radiations collected and focussed upon the sensitive unit will vary. This variation will initiate a temperature variation in the unit, and this temperature variation can be translated into a voltage which may be utilized to actuate signal indications. When a target is situated in a section observed upon, the particular direction of the target to the detection system can be obtained by observing the position of the scanning mechanism at the particular instant at which a target signal is received.

The system, in accordance with the invention, comprises a minimum of moving parts, which fact reduces equipment vibrations, and also has the requisite flexibility for scanning in elevation and in azimuth. The elevation and azimuth target signals received can be transmitted to indicating equipment through a single amplifier, which fact tends to obtain equipment economy.

Examples of thermal-energy sensitive units commonly used in detection systems are, thermocouples, thermopiles, photoelectric cells and bolometers. In the preferred embodiment of the invention a thermistor-bolometer unit is utilized. A bolometer is an instrument used to measure or detect small quantities of thermal-energy by means of thermally induced changes in the bolometer resistance. Thermistors are manufactured from an especially thermal-sensitive material, the resistance of which varies rapidly with changes in temperature, and usually possess a temperature coefficient of resistance ten times greater than that of pure metals. Thermistor material may be constructed as shown in Patent 2,414,793, issued January 28, 1947, to J. A. Becker and H. Christensen. Thermistor-bolometers can be manufactured as shown in Patent 2,414,792, issued January 28, 1947, to J. A. Becker. Any other suitable methods of construction and manufacture may be utilized.

With detection systems using thermistor-bolometers it is possible to detect radiation from a man's hand at a distance of five hundred feet, while radiations emanating from a large heat source can be detected at distances of ten miles or more. Objects can be detected by night or day, and since the detection system emits no signal, secrecy in the procurement of target bearings is attained.

In interpreting the drawings it will sometimes be found convenient to refer to the elevation angle of incidence as the angle $\Phi$, to the azimuth angle of incidence as the angle $\theta$, and to the angle of the scanning reflector as the angle 0. The symbols $\pm \theta$, $\pm \Phi$ and 0 are merely subscripts for the designation F and there is no implied or actual addition or subtraction.

Referring to the drawings:

FIG. 1 is a schematic drawing of equipment in accordance with a particular embodiment of the invention;

FIG. 1A is a schematic drawing of an oscilloscope system which may be utilized as an indicator in the system of FIG. 1;

FIG. 2 shows the geometrical relationships which exist when the reflector of FIG. 1, in the course of its cycle of rotation, reaches its topmost position;

FIG. 3 shows the geometrical relationships which exist when the reflector of FIG. 1 in the course of its cycle of rotation, reaches its lowest position;

FIGS. 4, 5 and 6 are schematic drawings showing the travel of the focal point of the reflector of FIG. 1 along circular pathways; FIG. 4 shows system movement in elevation, FIG. 5 shows system movement in azimuth, and FIG. 6 shows extreme cases of system motion in both azimuth and elevation;

FIGS. 7, 8, 9, 10, 11 and 12 are schematic drawings showing the travel of the focal point of the reflector of FIG. 1 in relation to various thermal-sensitive element arrangements, any of which can be utilized in the system of FIG. 1;

FIGS. 13 and 14 show other arrangements of thermal-energy sensitive elements either of which can also be utilized in the system of FIG 1;

FIG. 15 is a schematic drawing showing the thermal-sensitive element arrangement of FIG. 13 connected to an amplifier and a biasing circuit;

FIG. 16 is a schematic drawing showing the thermal-sensitive element arrangement of FIG. 14 connected to an amplifier and a biasing circuit;

FIG. 17 shows a center tapped bolometer element connected to a biasing circuit and an amplifier, and this arrangement is also adaptable for use in the system of FIG. 1; and FIG. 18 is a schematic drawing of a thermal-energy sensitive element arrangement connected to an amplifier and a gas tube circuit, and this arrangement is also adaptable for use in the system of FIG. 1.

Referring to FIG. 1 there is shown a schematic drawing of equipment in accordance with a particular embodiment of the invention. A shaft 30, adaptable for rotation is actuated by a motor 31 which may be energized in any suitable manner. Secured to the shaft 30 is a parabolic reflector 32 which revolves with the shaft 30. The reflector 32 is eccentrically mounted on the shaft 30 so that the optical axis of the reflector 32 is parallel to but offset from the reflector motion axis. The reflector 32 is designed for scanning an area, and for collecting thermal-energy radiations emanating from the area and focussing them at a point in space. Situated in front of the focal plane of the parabolic reflector 32 is a bolometer unit 33. The bolometer 33 comprises a housing 34 with a window 35 in the housing. The window 35 may be composed of any suitable material. A window composed of a sheet of silver-chloride will pass infra-red radiations. If it is desired to exclude ultra-violet radiations, from the interior of the bolometer unit 33, the window can be composed of a sheet of silver-chloride coated with gilsonite, while if it is desired to exclude visible radiations, the silver-chloride may be coated with silver-sulphite.

Contained within the bolometer 33 are thermal-energy sensitive elements 36 and 37. The element 37 is completely shielded from outside thermal-energy radiations by the housing 34, and acts as a thermal compensator for the element 36. The element 36 is partly shielded from impinging thermal radiations by the housing 34, but radiations collected by the scanning parabolic reflector 32, from an area under observation, may enter through the window 35 and impinge upon the front exposed surface of the element 36. The elements 36 and 37 are contained in a biasing circuit which also includes adjustable resistors 38 and 39, an electromotive source 40 and condensers 41 and 42. The elements 36 and 37 together with the condensers 41 and 42 form arms of a bridge network across which are connected the source 40 and the adjustable resistances 38 and 39. The bridge network can be maintained in a normal balance, by adjustment of the resistances 38 and 39, provided that the amount of thermal-energy radiations directed upon the exposed element 36, by the reflector 32, does not vary. Any variation in the amount of the directed radiations, such as would be occasioned by encountering a source of temperature discontinuity in an area under observation, will result in a variation in the amount of radiation impinging upon the element 36, and will initiate an unbalance of the bridge network by varying the temperature and resistance of the element 36. Unbalances of the bridge network, resulting from variations in the resistance of the element 36, cause a voltage variation across the bridge between a common junction point 43 and ground. The resulting voltage is led from the junction point 43, through a coupling condenser 44, to an amplifier 45. An output from the amplifier 45 is led to a strobotron tube indicator 46.

It will be understood that the element 36 may be arranged within the bolometer 33 in a vertical position as illustrated, or may, if desired, occupy a horizontal position. Also the bolometer 33 may be utilized in the system with both of the sensitive elements 36 and 37 exposed to impinging thermal radiations from the reflector 32. The system is intended for use with a variety of element arrangements, such as shall hereinafter be described.

Attached to the shaft 30 and adaptable for rotation is a disc 48, and situated at a point on the disc 48 is a pointer 49 which serves as a datum or reference point in relation to a chart 50. The chart 50 occupies a fixed position in relation to the shaft 30. Since the position of any point in the motor drive system is related to an instant position occupied by the reflector 32, and therefore to the optical and motion axes of the reflector, the chart 50 can be calibrated in terms of either the vertical or azimuthal angles of radiation incidence upon the reflector 32, at the various positions occupied by the reflector. The pointer 49 is adaptable for sweeping over the chart 50, and the position of the pointer 49 in relation to the chart 50 may, at any given instant, be an indication of the vertical or azimuth angle of radiation incidence at that particular instant.

When the strobotron tube indicator 46 is utilized the tube 46 is triggered by the build-up of a target signal pulse originated at the junction point 43, between the elements 36 and 37. The target signal pulses originated by unbalance of the bridge circuit trigger off the strobotron tube 46 and the tube illuminates the pointer 49 at the instant the target signal appears, and for a few microseconds time thereafter. Periodic target signals, which occur at a fixed value of the radiation incidence angle, will illuminate the pointer 49 each time the scanning parabolic reflector 32 sweeps through that particular angle of incidence. Due to the persistence of vision the pointer 49 will appear to be motionless, at that particular angle of incidence indication, upon the calibrated chart 50. If the target and system are moving in relation to each other, the value of the angle of incidence will change, and the pointer will appear to move in relation to the chart 50, and will indicate the change direction.

The shaft 30, motor 31, reflector 32 and bolometer 33 are positioned within a container 51. One side of the container 51 is shown removed in the drawing in order that the arrangement of the various component parts within the container may be readily viewed. The container 51 is mounted upon a vertical tilt mechanism 52, and the vertical positions occupied by the container are controllable by a handle 53. The vertical position occupied by the container at any instant may be obtained from a vertical tilt indicator 54. The tilt mechanism 52 is supported upon a turntable 55, and the container may be turned in horizontal directions by a crank handle 56. The horizontal position occupied by the container at any instant may be obtained from a horizontal position indicator 57. Mounted upon the container 51 are sighting mechanisms 58 and 59. The various component parts of the equipment may be supported in any suitable manner.

Referring to FIG. 1A, there is schematically shown an oscilloscope system 47 which may be utilized in the system of FIG. 1 instead of the strobotron tube indicator 46. When the oscilloscope system is used in the system the movement of the oscilloscope electron beam is synchronized with the movement of the scanning reflector 32 of FIG. 1 in any suitable and known manner. The sweep axis 29 of the electron beam may be calibrated in values of the angles of vertical or horizontal radiation incidence. The target signal pulses originating at the junction point 43 of FIG. 1, can be applied through the amplifier 45 to deflection coils of the oscilloscope 47, and the position of occurrence of the target signal along the sweep axis 29, of the oscilloscope 47, can indicate the instant value of the vertical or horizontal radiation angles of incidence.

There are individual advantages obtained from use of either the strobotron indicator 46 or the oscilloscope 47. Where economy and simplicity of operating equipment is desired, as in aeronautical work, the strobotron indicator may be preferred. Where economy of equipment is not a consideration the use of an oscilloscope indicator may be advantageous from the fact that the target signal and signals resulting from extraneous noise are always in view upon the oscilloscope screen. The persistent prominence of the target signal will be obvious in relation to the irregular screen appearances of the random noises.

Referring again to FIG. 1, the system operates as follows: The container 51 is motivated towards various sections of an area under observation, and thermal-energy radiations originating within the area are collected by the rotating reflector and focussed upon the exposed thermal-sensitive strip 36 within the bolometer unit 33. When in the course of the scanning operation a section of the area is reached which is occupied by a target, of a different thermal diffusiveness than that of the section per se, the amount of thermal-energy collected by the reflector 32, and directed upon the element strip 36, will vary and will initiate an intermittent temperature variation in the element 36. This temperature variation intiates a corresponding resistance variation in the element 36, and changes the resistance of the element, which causes a momentary unbalance of the bridge circuit. The unbalance of the bridge circuit results in a potential variation across the bridge between the junction point 43 and ground. This potential variation is led through the condenser 44 and is amplified by the amplifier 45, and can be utilized to actuate either of the signal indicating devices 46 or 47, as was explained above.

Approximately $10^{-7}$ watts of thermal-energy radiation incident upon the sensitive element strip 36 for a few milliseconds time will originate a signal, and for that amount of incident radiation the temperature of the strip 36 increases by approximately a millionth of a degree centigrade, and about one microvolt potential, resultant from the unbalance of the bridge circuit, is fed to the amplifier 45.

A fuller understanding of the invention may be readily obtained by a contemplation of the geometric functions involved in the operation of the system. These functions are shown in the drawings FIG. 2 to FIG. 12.

Referring to FIG. 2 there are shown the geometrical relationships which exist when the reflector 32, of FIG. 1, reaches the topmost position in the course of the rotation cycle. In FIG. 2, $h$ is the distance separating the reflector optical axis from the reflector motion axis. The line 100' represents the reflector optical axis, and the line MM' represents the reflector motion axis. If thermal energy radiations impinge upon the reflector in parallel rays from a section of an area under observation, the rays are brought to a focus by the reflector 32 at a point $F_0$. As the driving shaft 30 of FIG. 1 rotates the reflector 32 about the motion axis MM', the radiation angle of incidence does not change, and the focal point $F_0$ travels along a circular pathway which has a radius $h$. Thermal-energy radiations impinging upon the reflector at an angle $+\Phi$ will be focussed at a point $F_{+\Phi}$, while radiation that impinges upon the reflector at an angle $-\Phi$ will be focussed at a point $F_{-\Phi}$. These points of focus also travel along a circular pathway which has a radius $h$.

Referring to FIG. 3 there are shown the geometrical relationships which exist when the reflector 32 of FIG. 1 reaches the lowest position in the course of the rotation cycle. The geometrical functions shown in FIG. 3 are similar to those discussed in relation to FIG. 2.

Referring to FIG. 4 there are shown the loci of the focal points $F_0$, $F_{+\Phi}$ and $F_{-\Phi}$, which were discussed in relation to FIGS. 1 and 2, as viewed from the intersection of the motion axis MM' and the reflector 32. FIG. 4 is intended to show the extreme positions which the focal circles can occupy if the system is moved in elevation but held fixed at a zero angle of incidence in azimuth. The loci of the thermal-energy radiations impinging upon the reflector 32, at angles situated between the extremes $\pm \Phi$, will be positioned between the extreme loci points $F_{+\Phi}$ and $F_{-\Phi}$. In the drawing of FIG. 4 it has been assumed that the azimuth angle of incidence $\theta$ is constant and of zero value. However, it is evident that the reflector 32 of FIG. 1 moves in both azimuth and elevation directions. The line HH' represents the horizontal axis of the system, and the line VV' represents the system vertical axis.

Referring to FIG. 5 there are shown the loci points $F_0$, $F_{+\theta}$ and $F_{-\theta}$ which result from radiations impinging upon the reflector 32, from a section under observation, at azimuth angles 0, $+\theta$ and $-\theta$, respectively. FIG. 5 is intended to show the extreme positions which the focal circles can occupy if the system is moved in azimuth but held fixed at a zero angle of incidence in elevation. In the drawing of FIG. 5 it has been assumed that the elevation angle of incidence $\Phi$ is constant and of zero value. The radii of the focal circles of FIG. 5 are equal to the radii of the focal circles of FIG. 4, for if the symbol for elevation angle of incidence $\Phi$ is replaced by the symbol for the azimuth angle of incidence, $\theta$, in FIGS. 2 and 3, the radius $h$ is equal to $f$ times the tan of the angle $\theta$. FIGS. 2 and 3 can be of assistance in understanding FIG. 5, if the symbols $\pm \Phi$ of FIGS. 2 and 3 are changed to $\pm \theta$.

Referring to FIG. 6 which is a combination of the drawings of FIGS. 4 and 5, and which shows in addition the positions of the focal circles, when the elevation angle of incidence $\Phi$ and the azimuth angle of incidence $\theta$ are situated at all possible combinations of their maximum values, as is defined by the equation $$\Phi = \theta = \arctan \frac{h}{f}$$

The loci of impinging thermal energy radiations, having any combination of angles of incidence less than this limit, will be situated within the limiting area as defined by FIG. 6. The focal circles of FIG. 6 can never extend beyond the four corner circles shown, or beyond the tangent lines joining these four circles. Theoretically all the light rays parallel to the optical axis, which impinge upon a parabolic reflector, pass through a focal point situated upon the reflector optical axis.

Referring to FIG. 2, a light ray impinges upon the mirror 32 at an angle $+\Phi$ with respect to the optical axis. This light ray strikes the mirror 32 at its optical center 0, and at this point the mirror face is perpendicular to the optical axis and light striking at this point behaves in the same manner as if it had impinged upon a plane mirror. It is true, for a plane mirror, that the angle of incidence and the angle of reflection of a light ray are equal with respect to the mirror. In the illustration of FIG. 2 above, the angle of incidence and angle of reflection are considered in respect to the mirror tangent since this tangent would coincide with the mirror face at 0. The complements of these angles, namely, the angle of incident light and the angle of reflected light, are equal with respect to the optical axis. The focal plane will pass through the focal point $F_0$ and be paralleled to the tangent of the mirror 32. The light ray striking at the angle $+\Phi$ impinges upon the focal plane at the point $F_{+\Phi}$ at a distance $h$ from the point $F_0$ as measured in this plane. Therefore by definition:

(1) $$\tan \Phi = \frac{h}{f}$$

(2) $$\Phi = \arctan \frac{h}{f}$$

The mechanical axis is parallel to the optical axis and is separated therefrom by a distance $h$, and this distance $h$ can also be called the displacement, or radius of eccentricity, between the mechanical and optical axes. The rays of light discussed are situated in the plane of the drawing, and it has been assumed that the optical mechanical axes are also situated in this plane which is defined as vertical in relationship to the earth. However, the same conditions will maintain for any plane containing these axes. As the system is rotated about the mechanical axis the distance $h$ remains fixed and when the rotation is 90 degrees the plane is horizontal. Then, the angle of incident light $\theta$ is also equal to $$\arctan \frac{h}{f}$$

(3) $$\theta = \arctan \frac{h}{f}$$

This establishes the physical basis for relating the radius of eccentricity with the displacement $h$ for a light ray which impinges on the mirror 32 at the optical axis 0.

It is true that rays of light which approach the mirror 32 at an angle $+\Phi$ and which do not impinge upon it at point 0 are not reflected through a common focal point, except when $\Phi$ is of zero value. However, in actual practice $\Phi$ is a small finite angle and the deviation is so small that the equations $$\Phi = \arctan \frac{h}{f} \text{ and } \theta = \arctan \frac{h}{f}$$

are true for practical purposes. They are true certainly within the limits of accuracy to which the mirror can be constructed plus the accuracy with which the deviation can be measured.

A number of thermal sensitive element arrangements are available for use in the bolometer 33, shown in the system of FIG. 1. These various element arrangements will be discussed in relation to FIGS. 7 to 18, and are readily adapted to obtain certain advantages from the geometric functions explained in relation to FIGS. 2 to 6. By utilization of these element arrangements, elevation or azimuth information, or both elevation and azimuth information may be obtained by the system of FIG. 1.

Referring to FIG. 7, there is shown a bolometer element 60 which may be substituted for the exposed element 36 of FIG. 1, and which subtends the entire horizontal range defined by FIG. 5. When the sensitive element 60 is used in the bolometer, any circular pathway described by the focal point of the reflector 32, will cross the element 60 twice, except for the extreme values of the elevation angle of incidence Φ, when the focal point will cross the element 60 only once. If the azimuth angle of incidence θ is zero, then for all values of the elevation angle of incidence Φ the corresponding focal circles will have their centers on the vertical axis VV'. It is evident from a study of FIG. 7 that the focal circles shift up and down as the elevation angle of incidence Φ varies, and as the focal circle shifts the focal point which contains the target image. The focal point will cross the element 60 at different points in the cycle of rotation of the reflector 32 of FIG. 1. Since the reflector 32 has two extreme azimuthal positions in one cycle of rotation, there are two points where the reflector focal point crosses the element 60. These two points of impingement may be used as reference points, and as points of indication at which a target signal occurs. If the reflector is turned through an angle A, so as to place the reflector focal point on the element 60 at a point P, it will be evident that a second target signal can occur when the focal point again impinges on the opposite end of the element 60 distant from the point P at an angle 180 degrees distant.

Referring to FIG. 8 there is shown a sensitive element 61, which may be substituted for the exposed element 36 of FIG. 1, and which is positioned along a vertical axis VV'. When the element 61 is used in the system the azimuth angle of radiation incidence θ may be determined in a manner similar to that discussed in relation to FIG. 7.

When searching for a target in elevation the entire detection equipment contained within the container 51 of FIG. 1 is rotated through a vertical angle until the indicator system shows that a target lies in the field of view of the system, that is within ±Φ maximum degrees of the optical axis of the system. Suppose the strobotron indicator 46 is used in the system of FIG. 1 and that the detection system is situated in an airplane to track a ship target situated below. Once it is established that a target lies in the field of view of the system a preferred tracking technique is to maintain the elevation angle of incidence Φ at zero value, while the vertical angle through which the detection system is rotated defines the angular position of the line of sight to the ship target. To achieve this technique the vertical angle of the detection system is continually and manually adjusted by the handle 53 of FIG. 1 so that each time the strobotron tube 46 fires the pointer 49 will be situated at "0" indication in reference to the calibrated chart 50, of FIG. 1. When this condition is maintained the system axis MM' of FIGS. 2 and 3 would, if extended, contain the ship target. Similar techniques may be applied while searching and tracking a target in azimuth.

Referring to FIG. 9, there is shown a sensitive element 62, which may be substituted for the exposed element 36 of FIG. 1. When the bolometer element 62 is positioned as illustrated it is evident that, if the azimuth angle of incidence θ remains at zero value, the focal circle of the reflector 32 will cross the element 62 twice, for all values of the elevation angle of incidence Φ, except the extreme values. Should the azimuth angle of incidence θ change in value one end of the focal circle will slip off the extreme end of the bolometer element strip 62, and but one target signal will be initiated since the focal circle will cross the element 62 only once. The presentation system used in the detection system can be such that a target signal initiated at an angle A may be easily distinguishable from a target signal initiated at an angle A±180 degrees, and the direction in which the azimuth angle of incidence θ is changing can be obtained. Since the preferred tracking technique involves the maintenance of the elevation angle of incidence Φ at zero value, the azimuth angle of incidence θ may be held within limits determined by the length of the bolometer element 62. This corresponds to a condition in which the elevation angle of incidence Φ and the azimuth angle of incidence θ, are each of zero value. See FIGS. 5, 6 and 9. As the elevation angle of incidence Φ becomes finite, that is greater than zero value, the accuracy with which the azimuth angle of incidence θ can be held to a zero value diminishes, since the length of the element 62 exceeds the chord of the focal circle with which it coincides. The sensitive element 62, as positioned in FIG. 9 and utilized in the system of FIG. 1, may be utilized to determine the system azimuth angle of incidence θ qualitatively and the elevation angle of incidence Φ quantitatively. The element arrangement of FIG. 9 can inform an observer when the detection system is "off target" in azimuth, but does not inform an observer of how far it is necessary to move the system to "center" the target. Information may be obtained from a quantitative indication to measure the time differences between target signal pulses and to compute accurately an incidence angle involved. Information obtained from qualitative indications may show the direction in which to orient the scanning equipment in order to center a target, but does not inform an observer as to how far the scanning equipment must be moved. Quantitative information is accurate and complete, while qualitative information is not complete.

Referring to FIG. 10 there is shown a bolometer sensitive element 63 which can be substituted for the exposed element 36 in the system of FIG. 1, and which can be used to determine the azimuth angle of incidence θ in a qualitative manner, and the elevation angle of incidence Φ in a qualitative manner. The focal circle of the reflector 32 will cross the element 63 twice, in a similar manner as discussed in detail in relation to FIG. 9.

Referring to FIGS. 11 and 12 there are shown other arrangements of sensitive elements 64 and 65, either of which may also be utilized in the system of FIG. 1 as a substitute for the exposed element 36. FIG. 11 shows the placement of an element strip 64 for obtaining azimuth information, while FIG. 12 shows the placement of an element strip 65 for measuring elevation.

Referring to FIG. 13 here are shown the two sensitive element strips 64 and 65 shown in FIGS. 11 and 12, arranged together in order to obtain both elevation and azimuth target signals. The use of this arrangement of element strips results in an economy of amplifier equipment, as shall be explained in relation to FIG. 15. The elements 64 and 65, arranged as shown in FIG. 13, can be used in the system of FIG. 1. When these elements are used in the system both of them are exposed to impinging thermal-energy radiations through the bolometer window, and the shielded element 37 shown in FIG. 1, is dispensed with, since the dual elements 64 and 65 will each form an arm of the bridge network and can act as thermal compensators for each other.

Referring to FIG. 14 there are shown bolometer sensitive elements 66, 67, 68 and 69 adapted for utilization within one system. The elements 66 and 67 are used for obtaining azimuth information, while the elements 68 and 69 are used for obtaining elevation information. The element arrangement of FIG. 14 can be used in the system of FIG. 1. When this arrangement is used in the system all of the elements are exposed to impinging radiation through the bolometer window, and the shielded element 37 of FIG. 1 is dispensed with since the elements 66, 67 and 68, 69 can act as thermal compensators for each other.

Referring to FIG. 15 which is a schematic drawing, and shows the elements 64 and 65 of FIG. 13 connected to the element biasing circuit of FIG. 1. A common junction point 70 between the elements 64 and 65 is connected through the coupling condenser 44 to an amplifier 71. Since the elements 64 and 65 are oppositely poled, the azimuth and elevation target signals initiated, when the amount of thermal radiation focussed upon either element by the reflector 32 varies, will also be of an opposite polarity to each other. These target signals of opposite polarity may be amplified by the amplifier 71 to more efficient working levels, and may then be separated from each other and recorded by a single indicator, or by separate indicators 72 and/or 73, by any suitable and known method. The element system arrangement of FIG. 15 offers considerable equipment economy where quantitative information is desired in both elevation and azimuth. This system is asymmetrical for once the detection equipment is in directional alignment with a target it is possible to remain "on target" since this element arrangement will obtain quantitative information in both azimuth and elevation directions, and small deviations from the "on-target" position may be readily corrected. However, if the focal circle of the reflector 32 of FIG. 1 passes completely into either of the right-hand quadrants of FIG. 13, the detection system will become blind in either elevation or azimuth. At the instant at which the reflector focal circle passes into the lower right-hand quadrant of FIG. 13, the detection system will become blind in both elevation and azimuth.

Referring to FIG. 16 here are schematically shown the elevation and azimuth bolometer elements 66, 67, 68 and 69 of FIG. 14, connected to the element biasing circuit of FIG. 1. Target signals initiated by the traverse of a thermal target image across the elements 66 and/or 67 will initiate positive target signal pulses, while target traverses on the elements 68 and/or 69 will initiate negative target signal pulses. The outputs from the junction points of the elements 66, 67, 68 and 69 are led through the coupling condenser 44 to an amplifier 74. The possible blindness of the detection system, discussed in relation to FIGS. 13 and 15, can be totally eliminated by use of the element arrangement of FIGS. 14 and 16. The target signal output of the amplifier 74 can be separated and processed, as discussed in relation to FIG. 15, and led to azimuth and vertical indicators.

Referring to FIG. 17 here is shown a bolometer sensitive element electrically divided into two electrically independent sections 77 and 78, and connected to the element biasing circuit of FIG. 1. This element arrangement can also be substituted for the elements 36 and 37 of FIG. 1. When used in the bolometer 33, both sections 77 and 78 are exposed to impinging thermal radiations through the bolometer window, and the shielded element 37 is dispensed with since the sections 77 and 78 act as thermal compensators for each other. When the reflector focal point impinges upon the strip section 77 positive target signal pulses can be originated, while when it impinges upon the strip section 78 negative target signal pulses can be initiated. The target signals are led to an amplifier 75, and can be separated and processed and led to indicators as discussed in relation to FIG. 15.

Referring to FIG. 18 which shows two sensitive elements 79 and 80 arranged for obtaining elevation information and connected to the biasing circuit of FIG. 1, this element arrangement can also be utilized in the system of FIG. 1, and when so used both of the element strips 79 and 80 will be exposed to impinging radiations from the reflector 32 through the bolometer window. Since the elements 79 and 80 serve as thermal compensators for each other, the shielded element 37 of FIG. 1 can be dispensed with. A common junction point 81 connects the elements 79 and 80 through the coupling condenser 44 to an amplifier 82. The elements 79 and 80 are shown in the drawing separated from each other at the junction point 81, but in practice they are arranged as close as possible to each other in order to minimize the possibility of a blind spot at the point 81.

The outputs from the amplifier 82 are connected through a transformer 83 to gas tubes 84 and 85. The gas tubes 84 and 85 are contained in a circuit which includes an electromotive source 86, condenser 87, and resistors 88 and 89. The outputs from the tubes 84 and 85 are connected to a reversible split field motor 90 which can be connected in any suitable manner to the vertical tilt mechanism 52 of the system of FIG. 1.

A target signal pulse initiated at the element 79 can vary the potential on the control electrode of the gas tube 84, and cause this tube to discharge. A target signal pulse initiated at the element 80 can vary the potential on the control electrode of the gas tube 85 and cause the tube 85 to discharge. Tube 85 in discharging will extinguish the tube 84. Since the elements 79 and 80 are oppositely poled the resultant target signal pulses from each element can be readily identified and separated and made to control the proper gas tube. Each of the tubes 84 and 85 can only be fired by a target signal from its associated element 79 or 80, and as each tube is fired by a target signal the other tube is extinguished. The voltage outputs of the tubes 84 and 85 are square-wave pulses of constant magnitude with duration times equal to the angular travel time of the focal point of the reflector 32 of FIG. 1. The angular travel time is the time taken for a target image to travel from element 79 to element 80, and from element 80 back to element 79, respectively. The difference in angular travel times from 79 to 80, and from 80 to 79 can be shown to be proportional to the angle of incidence of radiation, and therefore to the angle by which the optical axis of the reflector departs from the line of sight to the target. The output voltage pulses of the gas tubes 84 and 85 can be utilized to separately energize associated fields of the reversible split field motor 90. The motor 90 can be so connected to the output of the gas tube circuit that target signals initiated at the element 79 will energize the motor 90 in a clockwise direction and cause it to actuate the vertical tilt mechanism 52 so as to move the container 51 of FIG. 1 in an upward direction, while target signals initiated at the element 80 energize the motor 90 in a counter-clockwise direction and cause it to tilt the container 51 in a downward direction. When the target is centered and when the element arrangement shown is used, the elements 79 and 80 will initiate gas-tube pulses of the same duration time, and since these pulses are of an opposite polarity and initiate motor torques in equal and opposite directions, the position of the tilt mechanism 52 will not be affected by these opposite polarity pulses.

The time-potential product of the voltages applied to each motor field, and therefore the time-torque product of the torque developed by each motor field are proportional to the respective times of travel of the focal point from element to element. If, as stated above, the time-torque products are equal, the average torques developed by each motor field are equal to each other and oppose each other and the motor 90 does not turn. This is true when the angle of incident radiation has a zero value and when the optical axis of the system lies on the line of sight to the target. If the angle of incident radiation is not of zero value the time-torque products are not of equal value. Their average difference, or the net torque developed by the motor 90, is not of zero value, but is proportional to this angle of incidence. Therefore, if the angle of incidence radiation is not of zero value the motor develops a net torque which can move the entire system in such a manner as to reduce the angle of incidence to the zero value point whereat the time-torque products are equal in value and the motor 90 does not turn.

In tracking a target the line of sight is constantly shifting, and the angle of incident light is constantly shifting, for the optical axis and the line of sight are constantly moving out of alignment because of the relative motion of the target and the system. A human operator would maintain alignment of the system and a target by tilting the tilt mechanism 52 by means of the handle 53 of FIG. 1. The system of FIG. 18 can maintain this alignment automatically.

When the gas tube 84 is already ignited and when the gas tube 85 is then fired, the potential at the plate of the tube 85 drops from the supply value to a sustaining value. It is a reduction in value and hence a move in a negative direction. The condenser 87 transmits this pulse to the plate of the tube 84 depressing the potential of tube 84 to the sustaining value. If proper resistance capacity relations exist with square-wave generator circuit, the potential of the plate of the tube 84 will be held below the sustaining value for a long enough time period to extinguish the tube 84, and the tube 85 will remain ignited. If tube 84 is fired again, by the application of a suitable signal potential to its control electrode, the tube 85 will then be extinguished.

When the target image impinges upon the element 79, the tube 84 fires and remains ignited until the target image travels along the circular pathway, from the element 79, and impinges upon the element 80. When the target image reaches the element 80 the tube 84 fires and extinguishes the tube 84. The length of time the tube 84 is ignited is the length of time required for the target image to travel along the focal circle pathway from the element 79 to the element 80. If the center of the focal circle is situated at point 81, as shown, this travel time is equal to the length of time required by the thermal image to travel from 80 back to 79. This condition is the "on-axis" condition which corresponds to an angle of incident radiation having a zero value.

Since tubes 84 and 85 are alternately fired for equal lengths of time, the motor 90 may be said to be driven in opposite directions for equal lengths of time, and this condition results in a net motor travel of zero value. If the pulsing duration time is short, as compared to the time constant of the motor 90, the motor will actually have a negligible amount of motion and will practically remain motionless when an "on-axis" condition exists.

When an "off-axis" target is observed the center of the focal circle will no longer be situated at the point 81 but will be situated elsewhere in relation to that point. Suppose the center of the focal circle is shifted to a point above the point 81, then it will be evident that the time required for the target image to travel from the element 79 to the element 80 is less than the time required for it to travel from element 80 back to element 79. Therefore, when this condition obtains the tube 84 will be ignited for a shorter period of time than will the tube 85, and the motor 90 will be driven by the tube 84 for shorter time periods than it will be driven by the tube 85, and the net motor travel motion will be determined by action of the tube 85. By suitably coupling the motor 90 to the tilt mechanism 52 of FIG. 1, the motor can tilt the entire detection system of FIG. 1 so that the focal circle returns to the "on-axis" condition shown in FIG. 18, which means that the motor 90 automatically maintains the optical axis of the system alignment with the line of sight to the target.

It will be readily understood that while the element arrangement shown in FIG. 18 is designed to convey information regarding the elevation angle of radiation incidence Φ, by rearranging the elements 79 and 80 in vertical positions information regarding the azimuth angle of incidence Φ can be obtained. The element arrangement shown in FIG. 14 can also be utilized in the system of FIG. 18, and both elevation and azimuth information will then be available. When the bolometer arrangement of FIG. 14 is used in the system of FIG. 18, a duplicate gas-tube, square-wave generator circuit will be necessary, and one of the motors will be used to control the elevation angle of the system, and the other motor will control the system azimuth angle. Both of the angles Φ and θ will be maintained at zero value thereby automatically maintaining the system line of sight to the target in both elevation and azimuth.

The amplifiers used in the invention are such as are known to those skilled in the art, and can be designed to obtain an optimum signal-to-noise ratio together with a minimum of distortion in target signal duration and wave form.

It is to be understood that the above-described embodiments are illustrative examples and that various modifications can be made without departing from the spirit of the invention.

What is claimed is:

1. In a thermal-energy system for scanning an area to detect and locate a target situated therein, and from which a different amount of thermal-energy emanates than from said area per se, the combination of, a thermal unit containing a plurality of thermal-energy sensitive elements radially arranged with reference to a datum point within said unit, means for collecting and focussing upon said elements in an intermittent and consecutive manner thermal-energy radiations collected from said area, said collecting and focussing means comprising a parabolic reflector eccentrically mounted with reference to the reflector optical axis.

2. In a thermal-energy detection system for scanning an area to detect and locate objects situated within said area, and said objects having a thermal diffusiveness different from said area per se, the combination of, a reflector, a thermal-energy responsive device situated in the focal plane of said reflector, said device containing a plurality of thermal-energy sensitive elements arranged radially with reference to a datum point within said device, and means to rotate said reflector at a predetermined frequency about a motion axis offset from but parallel to the reflector optical axis, whereby the focal point of said reflector follows a circular pathway in space, as said reflector revolves, and intermittently impinges upon said responsive device.

3. In a thermal-energy system, for scanning an area to detect and locate targets from which a different amount of thermal-energy emanates than from said area per se, the combination of, rotating means, means comprising a thermal-energy responsive unit for producing voltage variations in accordance with variations in the amounts of thermal-energy radiations impinging thereon, a parabolic reflector rotatably positioned upon said rotating means so that the reflector optical axis is offset from but parallel to the reflector motion axis, said responsive unit situated in front of the focal plane of said reflector and said reflector scanning said area collecting thermal-energy radiations therefrom and focussing them upon said unit, indication means connected to said unit, said indication means comprising a strobotron device for furnishing a visual indication of said voltage variations, a dial calibrated in angular measurement units, and said strobotron device positioned to illuminate said dial.

4. In a thermal-energy detecting system for scanning an area, to detect and locate the position of a target situated therein, the combination of, a thermal-energy sensitive unit including a plurality of thermal-energy sensitive elements arranged radially with reference to a datum point within said unit, means for scanning said area collecting thermal-energy emissions emanating therefrom and directing them upon said unit, said scanning and collecting means comprising a rotating parabolic reflector having an optical axis and a motion axis and said reflector optical axis being offset from but parallel to said motion axis, and said directed radiations impinging upon said elements in an intermittent and successive manner and at time instants related to the instant angular positions occupied by said reflector relative to said target.

5. In a themal-energy detection system for scanning an area to detect objects situated within said area the combination of, a unit containing a plurality of thermal-energy sensitive elongated elements horizontally and vertically situated in relation to a datum point in said unit, rotating means, a reflector rotatably situated upon said rotating means and the reflector optical axis offset from but parallel to the reflector motion axis, said unit situated in the reflector focal plane so that the reflector focal point intermittently and successively impinges upon members of said unit element plurality, an indication circuit connected to said elements, and means in said circuit for initiating signals whenever the amounts of thermal-energy focussed upon a member of said unit element plurality varies.

6. In a thermal-energy system, using an eccentrically mounted parabolic reflector for scanning an area to detect an object within said area, the method comprising, collecting thermal-energy from said area, initiating signal voltages in accordance with the instant angular position of said object relative to said system, converting said signal voltages into square-wave control voltages having a duration time which is a function of the angular travel time of said reflector focal point, and establishing control of the directional alignment of said object and said system in accordance with said control voltages.

7. The method of scanning an area in elevation and azimuth to detect a thermal-energy source situated therein by means of a temperature differential between said source and the source surroundings comprising, collecting thermal-energy radiations from said area, said collecting means comprising a reflector mounted for rotation and having its optical axis offset from but parallel to its motion axis, directing said collected radiations in a cyclic, successive and intermittent manner upon a multiple element thermal-sensitive unit, the elements of which are arranged radially in reference to a datum point, and relating each impingement instant of said radiations upon an element of said unit to an instant angular relationship of said system and the source of said collected radiations.

8. The method of scanning an area to detect and locate objects situated therein, which have a different thermal diffusiveness than has said area per se comprising, scanning said area, said scanning being obtained by an optical unit comprising a reflector mounted for rotation and having its motion axis offset from but parallel to its optical axis, cyclically changing the directions of thermal-energy radiations emanating from said area with respect to a reference direction, causing said redirected radiations to impinge upon a thermal-energy sensitive unit composed of elements arranged radially with reference to a datum point at time instances corresponding to the relative positions occupied at any given time instant by said system and the source of said redirected radiations, and initiating signals when said redirected radiations contain radiations from an object in said area of scan.

9. The method of scanning an area to detect and locate an object situated therein, said object emitting thermal-energy radiations of different intensities than are emitted from said area per se comprising, cyclically changing the directions of thermal-energy radiations emanating from said area in a known manner with respect to a reference direction, concentrating said redirected radiations at points in space in an intermittent and successive manner, causing said concentrated radiations to intermittently and successively impinge upon sensitive members arranged radially with reference to a datum point, of a thermal-energy sensitive unit, said causing means comprising a reflector mounted for rotation and having its optical axis offset from but parallel to its motion axis, and initiating signals whenever said redirected radiations contain radiations from said object.

References Cited in the file of this patent

UNITED STATES PATENTS

| | | |
|---|---|---|
| 2,403,066 | Evans | July 2, 1946 |
| 2,419,556 | Feldman | Apr. 29, 1947 |
| 2,423,885 | Hammond | July 15, 1947 |
| 2,431,625 | Jolson | Nov. 25, 1947 |